May 18, 1965 W. B. HUCKABAY ETAL 3,184,740
POSITION INDICATING AND COURSE PLOTTING DEVICE
Filed Feb. 15, 1962 8 Sheets-Sheet 3

Fig-3A

INVENTORS
WILLIAM B. HUCKABAY,
SHERMAN N. OATMAN &
BY WILLIAM H. PARKER

Dunlap Laney & Hubbard
ATTORNEYS

May 18, 1965 W. B. HUCKABAY ETAL 3,184,740
POSITION INDICATING AND COURSE PLOTTING DEVICE
Filed Feb. 15, 1962 8 Sheets-Sheet 6

INVENTORS
WILLIAM B. HUCKABAY,
SHERMAN N. OATMAN &
BY WILLIAM H. PARKER

Dunlap Laney & Hubbard
ATTORNEYS

3,184,740
**POSITION INDICATING AND COURSE
PLOTTING DEVICE**
William B. Huckabay, Sherman N. Oatman, and William
H. Parker, Dallas, Tex., assignors, by mesne assignments, to Rayflex Exploration Company, Richardson,
Tex., a corporation of Texas
Filed Feb. 15, 1962, Ser. No. 173,525
8 Claims. (Cl. 343—15)

The present invention relates to navigation, and more particularly, but not by way of limitation, relates to apparatus for indicating the momentary position of a moving station, such as a ship, on a chart of the area and for recording the course of the station.

The present invention is an improvement embodying the principles of the plotter device disclosed in the copending application of William B. Huckabay and William H. Parker entitled, "Position Determining System," Serial No. 839,353, filed September 11, 1959, and assigned to the assignee of this invention.

It is necessary in offshore seismic survey work to record the path of the ship so that the position of the ship at each seismic "shot" can be determined with precision. It is also highly desirable to be able to continuously and visually determine the momentary position of the ship on a chart of the locality so that the ship can be steered along a predetermined course. It also may be desirable to be able to navigate a ship into a harbor with great accuracy even under adverse weather conditions. In many cases it may be highly desirable to have a continuous display of position information, such as might be derived from radar, sonar or other radiant energy distance and position measuring equipment, directly on the same chart upon which the position of the ship is indicated, and to maintain the position information properly orientated on the chart. When a plotter of this type is utilized on board a ship, it is subjected to extensive handling, must be used in relatively close quarters, and is frequently subjected to various forces by pitch and roll of the ship.

In the position determining system disclosed in the above-mentioned copending application, the distance of a station, for example a ship, from each of two reflective targets of known location is measured almost simultaneously by determining the period of time required for radiated energy, such as radio microwaves, to travel to the respective reflection targets and return to the ship. The distance to each of the targets is then represented in the electronic system by a voltage proportional to the distance.

The present invention contemplates a device utilizing voltages proportional to distances for indicating the position of a station moving relative to first and second targets of known locations comprising: first and second arms each pivotally supported at one end thereof for pivotal movement about first and second pivotal axes, respectively, the first and second pivotal axes being substantially parallel; station reference means pivotally interconnecting the first and second arms; servo means for moving the station reference means to a point spaced from the first axis a distance proportional to the momentary distance between the station and the first target; and servo means for moving the station reference means to a point spaced from the second axis a distance proportional to the momentary distance between the station and the second target, whereby the position of the station relative to the first and second targets will continuously be indicated by the position of the reference means relative to the first and second pivotal axes, respectively. It is also contemplated in certain embodiments of the invention to provide a means for recording the actual path of the station on a chart, as well as other embodiments hereafter described and claimed.

Therefore, it is an important object of the present invention to provide a device of the type described which is compact and efficient in operation.

Another object of the present invention is to provide a device of the type described which is substantially unaffected by rolling and pitching movements of the station, such as a ship, upon which the device is located.

Another object of the present invention is to provide a device of the type described which does not obstruct the view of the chart upon which the position of the station is indicated.

Still another object of the present invention is to provide a device of the type described which can be quickly, easily and accurately orientated for use by reference to any two known targets on any chart of the locality having the proper scale.

Additional objects and advantages will be evident from the following detailed description and drawings wherein:

FIGURE 8 is another circuit diagram of an electrical system used in the device.

Figure 1:
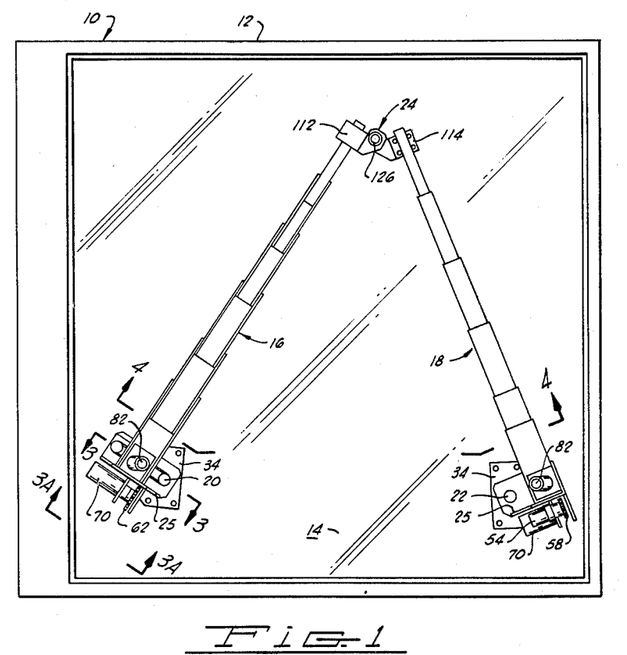
FIGURE 1 is a plan view of a device constructed in accordance with the present invention.
Figure 2:
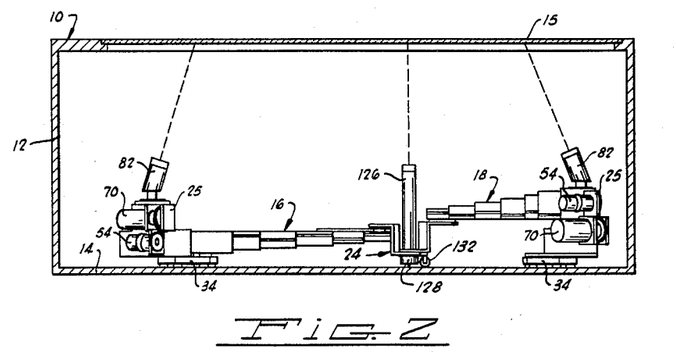
FIGURE 2 is a side elevation of the device of FIG. 1 with the housing of the device shown in section.

Referring now to the drawings, and in particular to FIGS. 1 and 2, the plotting device is indicated generally by the reference numeral 10 and preferably comprises a generally square housing 12 having a horizontally disposed support surface 14 which is preferably fabricated from a magnetizable metal for purposes hereafter described.

A plate 15 is supported by the top of the housing 12 and is disposed parallel to the support surface 14. The plate 15 is preferably fabricated from Lucite so that light which strikes the lower face of the plate will be visible to a viewer looking down onto the plate 15. The plate 15 can be fabricated from any suitable material which will produce a controlled display visible from above the plate, the display being in accordance with the pattern of radiant energy striking the bottom side of the plate 15.

A pair of telescopically extending and contracting arms 16 and 18 are each supported at one end thereof for pivotal movement about axes 20 and 22, respectively. The axes 20 and 22 are preferably parallel one to the other and disposed generally perpendicular to the support surface 14. The arms 16 and 18 are pivotally interconnected by a station reference means 24 at the ends remote from the pivot axes 20 and 22.

Figure 3:
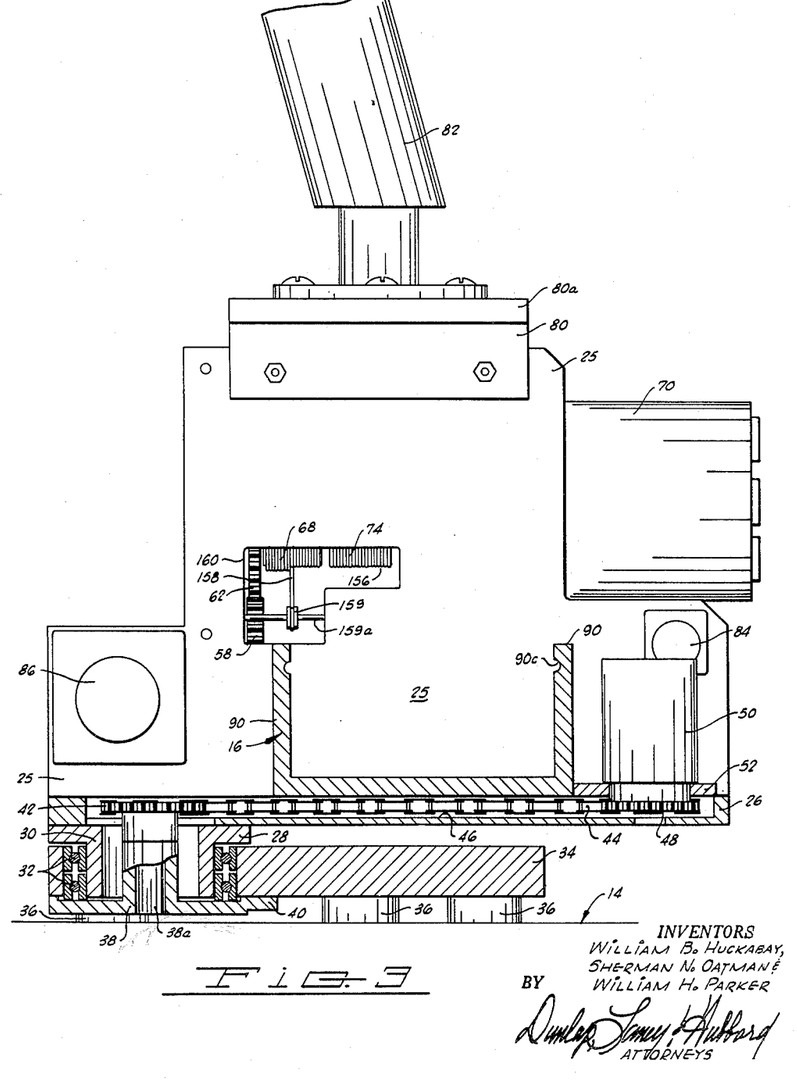
FIGURE 3 is an enlarged cross-sectional view taken substantially on lines 3—3 of FIG. 1.

As shown in FIG. 3, the arm 16 is connected to a vertically disposed support plate 25 and to a horizontally disposed support plate 26. The plate 26 is connected to the flange 28 of a tubular sleeve 30. The sleeve 30 is pivotally journaled by twin bearings 32 in a foot plate 34 for pivotal movement of the arm 16 and plates 25 and 26 relative to the foot plate 34. The foot plate 34 has a number of magnetic feet 36 which rest on and are attracted to the magnetizable surface 14. The magnetic feet 36 are preferably threadedly mounted in the foot plate 34 to provide a support means for the plate 34 and therefore the remainder of the arm support structure and arm 16.

A tubular sleeve 38 is connected to the bottom of the plate 34 by a flange 40. The tubular sleeve 38 is centered along the axis of the bearing 32 and has a sprocket 42 rigidly connected to the upper end thereof. The tubular member 38 has a bore 38a which extends upwardly through the sprocket 42 to permit visual reference to the point of the support surface 14 aligned with the pivotal axis of the twin bearings 32 for purposes hereafter described in detail. It should also be noted that the axis of the twin bearings 32 coincides with the pivotal axis 20 of the arm 16 mentioned in connection with FIG. 1.

An endless chain 44 is carried by the sprocket 42 and passes under the arm 16 in a channel 46 in the plate 26. The endless chain 44 also passes around a sprocket 48 which is carried by the control shaft of a differential generator 50. The differential generator 50 is mounted by a support plate 52 on the plate 26. The turning axis of the sprocket 42 is fixed relative to the foot plate 34 so that the sprocket 48 is turned in accordance with changes in the angular position of the arm 16, for purposes hereafter described in detail.

Figure 3A:
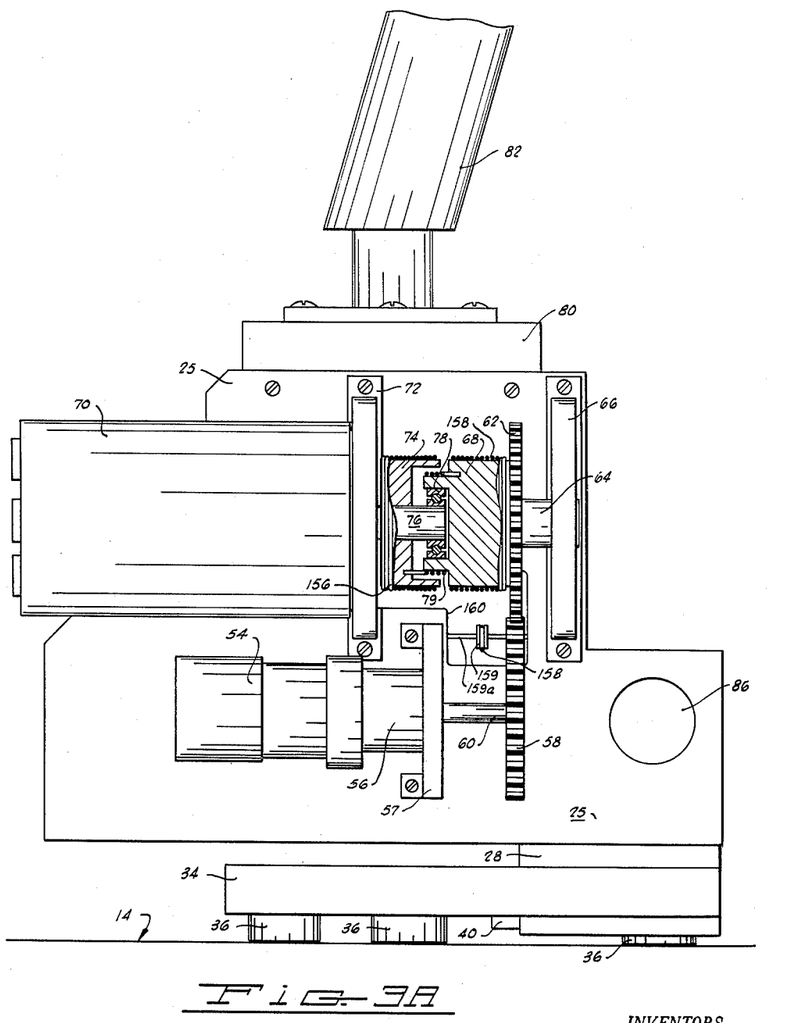
FIGURE 3A is an end view of one of the plotting arms as taken along lines 3A—3A of FIG. 1.

A servomotor 54 and gear reducer 56 (FIG. 3A) are mounted on the remote side of the plate 25 by a suitable support bracket 57. A gear 58 is mounted on the shaft 60 of the gear reducer 56 and meshes with a second gear 62. The gear 62 is mounted on one end of a drum 68 used in extending and retracting the respective arm 16 as will be described. A rotary potentiometer 70 is attached to a suitable support bracket 72 which in turn is connected to the plate 25. A second drum 74 is mounted on the shaft 76 of the potentiometer 70. The drum 74 and the drum 68 are axially aligned and are interconnected by a common bearing member 78 which maintains the drums 74 and 68 in alignment. The drums 68 and 74 are connected only by a tension spring 79 by which the drum 68 drives the drum 74, as will be described.

A lamp support bracket 80 (FIG. 3) having an L-shaped horizontally disposed portion 80a is connected to the plate 25 by any suitable means. A lamp 82 is mounted on the L-shaped portion 80a and is disposed to project a spot of light on the plate 15 at a point corresponding to the intersection of the axis of the twin bearings 32 and the plate 15. An electrical plug 84 is mounted in an aperture in the plate 25 to provide electrical connections for the differential generator 50, and a similar electrical plug 86 is mounted in another aperture in plate 25 to service the servomotor 54 and the potentiometer 70.

The support structure for the arm 18 (FIGS. 1 and 2) associated with the axis 22 is identical to the structure just described, except that the arm 18 does not have a differential generator and related apparatus associated therewith.

Figures 4, 5:
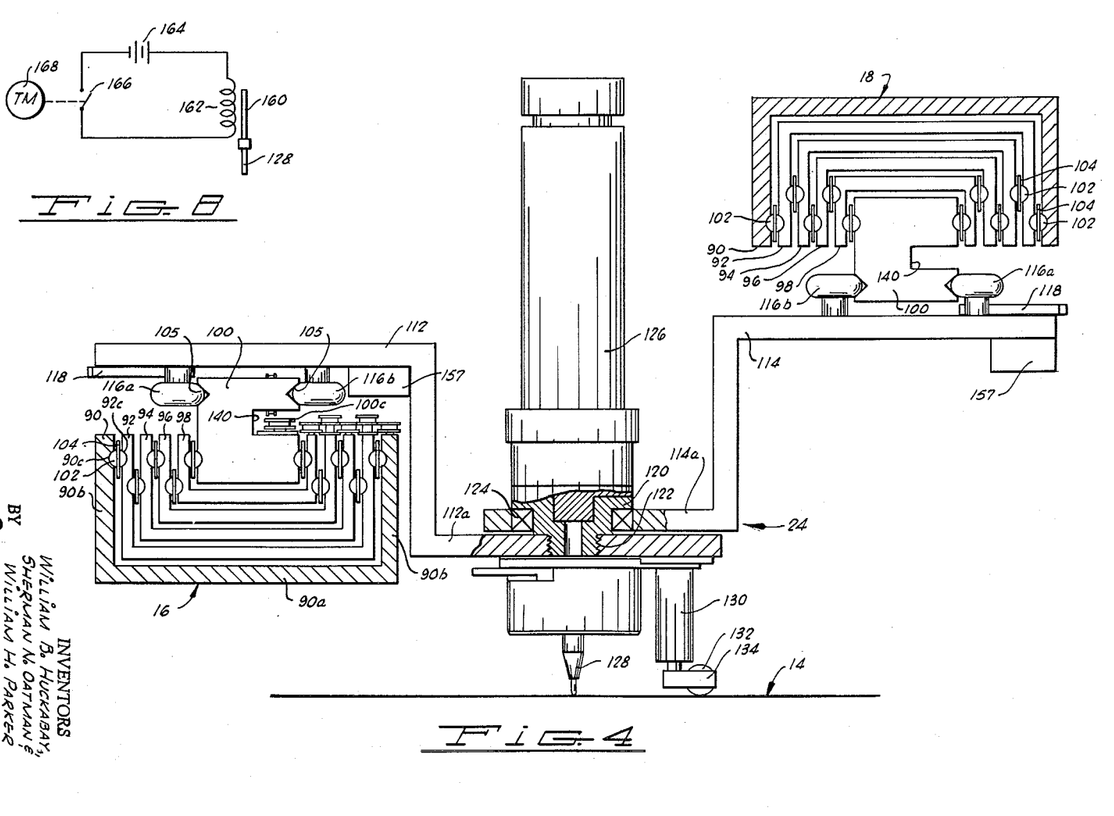
FIGURE 4 is an enlarged composite cross-sectional view taken on lines 4—4 of FIG. 1.
FIGURE 5 is a plan view, partially in section and partially broken away to show details of construction, of an arm of the device in FIG. 1.

Referring now to FIG. 4 which shows details of construction of the arms 16 and 18, it will be noted that the arms 16 and 18 are of substantially identical construction, except that the arm 18 is inverted and disposed at a higher level than the arm 16. For convenience, only the telescoping arm 16 will be described in detail, it being understood that the telescoping arm 18 is of generally the same construction.

The arm 16 comprises a plurality of nesting channel members 90, 92, 94, 96 and 98, and a substantially solid rectangular center member 100. Each of the adjacent nesting channels has a web portion, for example 90a, and two parallel side portions, for example 90b, it being understood that each of the successive channels are of substantially identical construction but of progressively smaller size as is evident in FIG. 4. The facing surfaces of the flanges 90b of each adjacent pair of channels, such as 90 and 92 for example, have facing, mating bearing races 90c and 92c, respectively. The facing bearing races 90c and 92c have arcuate cross sections and extend the entire length of the channel members. A plurality of ball bearing members 102 are received in the bearing races 90c and 92c and are maintained in spaced relation by a spacer member 104 which is disposed between the adjacent flanges of the nesting channel members and has apertures at spaced intervals therealong for receiving the several ball bearings 102. As will be evident from the cross-sectional view of FIG. 4, the flange of each channel member has a bearing means disposed on each side of each flange. The center telescopic member 100 is retained between the flanges of the innermost channel member 98 by bearing races and bearing means identical to the others previously described. In addition, the center member 100 has a pair of outwardly facing V grooves 105 above the level of the channel members, for purposes to be described.

The pivotal arms 16 and 18 are pivotally interconnected by a station reference means indicated generally by the reference numeral 24, as previously indicated. The interconnecting station means 24 has a first carriage arm 112 and a second carriage arm 114. The carriage arm 112 is connected through the grooves 105 of the arm 16 center member 100 on four radiused rollers 116a and 116b, only two of which are shown. The rollers 116a are adjustably moved into engagement by operation of suitable offset lever arms 118 held by a tension spring 119 as shown most clearly in FIG. 5. The carriage arm 114 (FIG. 4) is similarly connected for movement along the center member 100 of the arm 18.

The lower extension 112a of the carriage arm 112 receives a threaded member 120 in a threaded aperture 122. A ring-shaped bearing 124 is slip-fitted around the member 120 and is press-fit in an aperture of the lower portion 114a of the carriage arm 114. By means of the bearing 124, the carriage arm 114 is free to pivotally move around the member 120. A suitable radiant energy source 126, such as a conventional light bulb disposed within a lens barrel, is provided with a lens (not shown) for projecting a spot of light upon the underside of the Lucite plate 15, as is hereafter described in detail. The light means 126 is connected to the member 120 and therefore is rigidly connected to the carriage arm 112 and telescoping arm 16; whereas the light means 126 is pivotally supported on the carriage arm 114 and telescoping arm 18.

A scribe 128 is carried by the arm 112 in alignment with the pivotal axis of the bearing 124 and is preferably raised and lowered into engagement with the surface 14 by means of an electrically operating solenoid, as hereafter described in detail. The station reference means 24, and therefore the ends of the arms 16 and 18, are supported by a suitable caster mechanism 130 connected to the arm 112 and having a ball roller 132 retained within a yoke 134. The ball roller 132 engages the surface 14 and reduces the frictional resistance to movement of the station reference means to a minimum.

Referring now to FIG. 5, which is a plan view of the arm 16 substantially in the telescoped, retracted position, it will be noted that the largest, outer channel member 90 is connected to the vertical support plate 25, as previously described. Cylindrically shaped stops 90d are disposed in each of the bearing races 90c and are rigidly connected to the front end of the channel 90. Similar cylindrical stops 92a are disposed in the bearing races 92c and are connected to the rear end of the channel member 92 nearest to the plate 25. Similar stops 92b are disposed in the inner race of the channel member 92 adjacent the front or remote end and also connected to the channel member 92. Channel members 94, 96 and 98 each have pairs of stops 94a, 96a and 98a, respectively, on the outside of each flange adjacent the rear ends thereof and stops 94b, 96b and 98b, respectively, on the inside of each flange adjacent the front ends. The center member 100 has only stops 100a at the rear end.

Figure 5A:
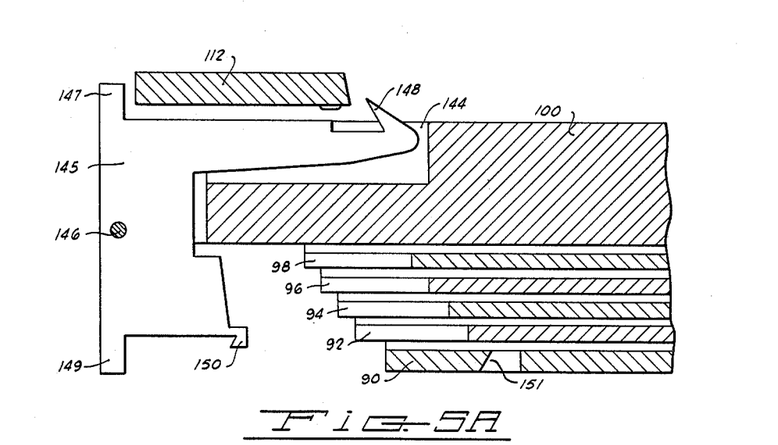
FIGURE 5A is an enlarged sectional view through the outer end of the arm shown in FIG. 5, as along the lines 5A—5A, showing the trigger of the arm in one operating position.

The channel member 90 is provided with a flexible line fulcrum member such as a pulley 90e adjacent the remote end. Channel member 92 is provided with two pulleys 92d and 92e at opposite ends as shown. Similarly, channel members 94, 96 and 98 are provided with pairs of pulleys 94c and 94d, 96c and 96d, and 98c and 98d, respectively. The center member 100 is provided with a rear pulley 100c and a front pulley 100d. The rear pulley 100c is disposed in a channel 140 which is best seen in FIG. 4 and extends the length of the member 100. The pulley 100d is disposed in a vertical plane in a slot 142. The center member 100 is also provided with a slot 144 in the outer end thereof (see also FIG. 5A) in which is pivotally supported a trigger 145 on a pin 146. The trigger has a projection 147 on the upper, outer end thereof and a hook 148 on the upper, inner end thereof which cooperate with the carriage arm 112, as will be described. Also, the trigger 145 has a projection 149 and hook 150 on the lower end thereof cooperating with the outer end and an aperture 151, respectively, in the large support channel 90, as will be described.

Figure 6:
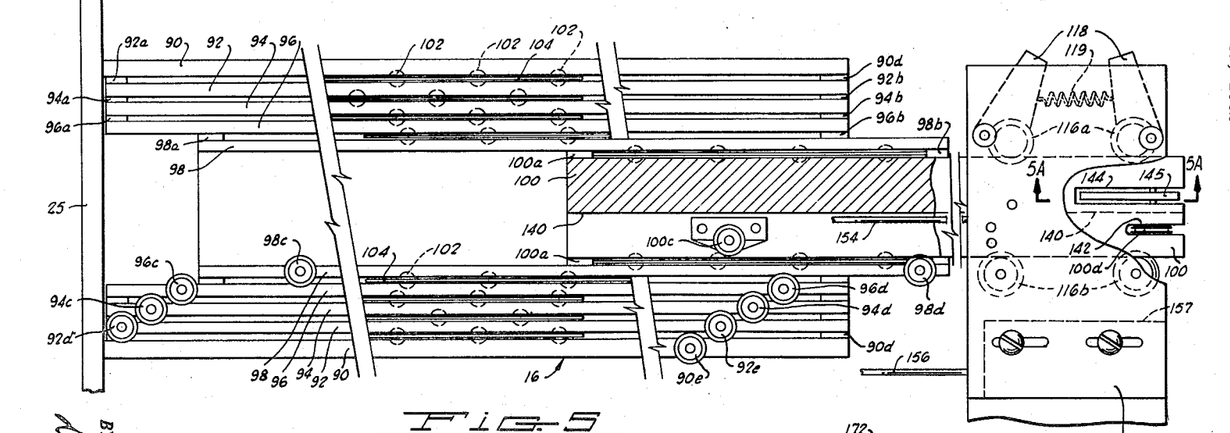
FIGURE 6 is a schematic drawing illustrating the operation of the device of FIG. 1.

The operation of the arm 16 is schematically illustrated in FIG. 6. The various schematic parts in FIG. 6 are given reference numbers corresponding to the numbers of the parts in the other figures. A cable 154 is wound around the potentiometer drum 74 and is connected directly to the rear end of the carriage arm 112. The drum 74 is also connected to rotate the potentiometer 70. A second cable 156 is connected to the carriage arm 112 by an adjusting block 157 and is wound around the drum 68 to return the carriage arm 112 to zero position, as will be described. A third cable 158 is carried by the servomotor drum 68 which is driven by meshing gears 62 and 58 and servomottor 54. The cable 158 passes around the pulley 90e, the rear pulley 92d, then the front pulley 92e of the channel member 92. The cable 158 successively passes around the rear pulley and then around the front pulley of each of the successive channel members 94, 96 and 98, then around the rear pulley 100c and the front pulley 100d of the center member 100. The cable 158 is then passed under the carriage arm 112 and connected to the rear end of the carriage arm 112. In order to prevent confusion, the cables 154, 156, and 158 are not shown in any drawings other than FIG. 6. The cables 154, 156 and 158 pass through an aperture 160 in the plate 25, as best seen in FIG. 3. It will also be noted in FIG. 3 that the cable 158 is passed over an idler pulley 159 slidingly mounted on a shaft 159a to guide the cable 158 onto the drum 68. The shaft 159a is carried by the support plate 25.

Figure 7:
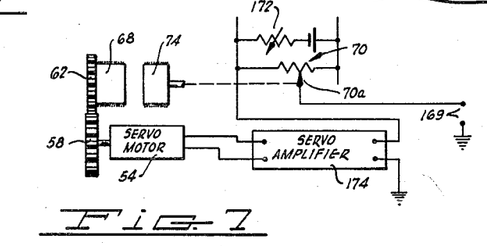
FIGURE 7 is a circuit diagram of a portion of the electrical system used in the present device.

FIG. 7 is a schematic circuit diagram of the servomotor and potentiometer circuit which controls the positions of the respective telescopic arms in response to the magnitude of the analogue voltage provided by the distance measuring equipment. The potentiometer 70 is represented by the conventional potentiometer symbol having a movable contact 70a, the position of which is governed by the drum 74. A variable resistor 172 is provided for calibration purposes. The analogue voltage from the distance measuring equipment is applied to the terminals 169 and thence through the potentiometer 70 to a servo amplifier 74 where the signal is amplified to drive the servomotor 54. As previously described, the servomotor 54 drives the drum 68 by the gears 58 and 62. It will be understood that each of the arms 16 and 18 has a servo system, although only one has been described.

Operation

In operation, the pivotal axes 20 and 22 (FIG. 1) of the pivotally supported telescopic arms 16 and 18, respectively, are positioned on the support surface 14 at points corresponding to the known locations of two reflective targets, which are normally on shore. The pivotal axes 20 and 22 may be positioned by sighting through the bores 38a (FIG. 3) of the pivot point when the foot members 34 are placed over a chart of the area which is spread over the support surface 14. Also, the pivot points 20 and 22 can be oriented by placing a transparent chart overlay over the Lucite plate 15 and by moving the respective support feet until the spots of light projected from the light sources 82 coincide with the target positions on the chart.

The electrical signals from the distance measuring equipment are applied to the terminals 169 of the servo means for each of the arms 16 and 18. The electrical signals for the arm 16 are proportional to the distance from the moving station, such as a ship, and the target upon which the axis 20 is oriented. A separate signal proportional to the distance between the ship and the target upon which the axis 22 is oriented is fed to the terminals associated with the arm 18. Each signal causes the servo mechanism to move the respective arm 16 or 18 to a length proportional to the distance between the ship and the respective target. When the signal is applied to the terminal 169, the voltage is applied through the potentiometer 70 to the servo amplifier 174 and then drives the servomotor 54. Assuming that the arm 16, for example, is at a proportionally shorter length than the distance between the ship and the corresponding target, the drum 68 will be turned in such a manner to wind the cable 158 onto the drum so that the cable will travel in the direction corresponding to the solid arrows 158a (see FIG. 6). As the cable is wound onto the drum 68 and thereby shortened in length, the carriage arm 112 is moved outwardly until the carriage arm 112 reaches the end of the center member 100 where the projection 147 on the trigger 145 (FIG. 5A) will stop its travel. Then the center member 100 will move out in the same manner and then each successive innermost channel member 98, 96, 94 and 92 will be telescopically extended or moved forward until the distance between the pivotal axis of the station reference means 24 and the pivotal axis 20 is proportional to the distance between the station and the respective target. This is accomplished by reason of the fact that, as the cable 154 is unwound from the drum 74, the potentiometer 70 is wound in such a direction as to alter the signal voltage applied to the servo amplifier to a zero or other reference potential which will cause the servomotor to cease operation.

The signal applied to the servo means of the arm 18 which is proportional to the distance between the station and the target corresponding to the axis 22 simultaneously operates to extend or contract the telescopic arm 18 to a length proportional to the distance between the station and the respective target in the same manner. So long as the station remains in the same position, subsequent signals applied to the terminals 169 will not result in a change in the position of either servomotor 54 and hence of either potentiometer 70. Should the station 24 move in such a manner as to be closer to the target corresponding to the axis 20, for example, the signal applied through the potentiometer 70, the servo amplifier 174 to the servomotor 54 would be changed and the drum 68 would move in a manner to wind the cable 156 on the drum 68 and pull the carriage arm 112 toward the pivotal axis 20. Simultaneously, the cable 158 is unwound from the drum 68. The tension of the cable 156 is transmitted through the carriage arm 112 and the trigger 145 (through the hook 148) to the member 100, whereby the channel members will be moved toward the retracted positions until the station reference means 24 is a distance from the axis 20 proportional to the distance between the ship or station and the respective target.

Figure 5B:
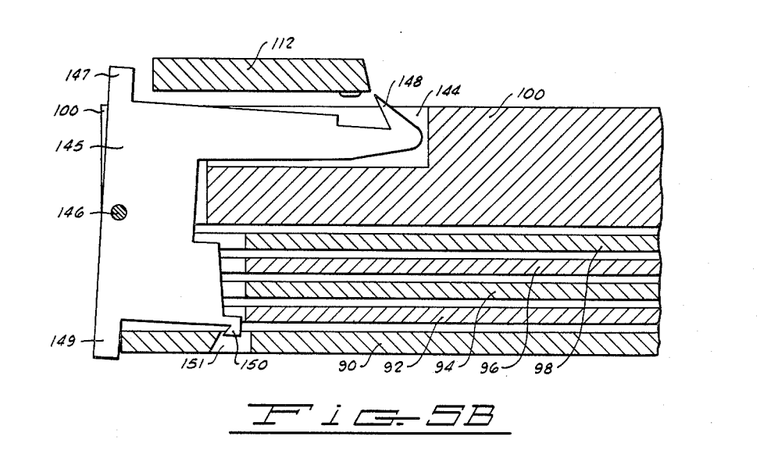
FIGURE 5B is a view similar to FIG. 5A showing the trigger in its other operating position.

When the carriage arm 112 is once moved to the outer end of the member 100, the trigger 145 will retain the carriage arm in this position until the trigger is shifted. That is, the projection 147 will prevent outward movement of the carriage arm 112 and the hook 148 will prevent inward movement of the carriage arm on the member 100 as long as the trigger member is in the position shown in FIG. 5A. When the arm 16 approaches its zero position when moving the scribe 128 toward the axis 20, the projection 149 contacts the outer end of the support channel 90 to pivot the trigger as illustrated in FIG. 5B. The hook 148 is thus moved down into the slot 144 below the level of the carriage arm 112, whereby the carriage arm may move on rearwardly on the member 100. Simultaneously, the lower hook 150 enters the aperture 151 in the channel 90 to hold the trigger in the position shown in FIG. 5B. The trigger stays in this position until the carriage arm 112 is again moved out to contact the projection 147.

As previously indicated, the lights 82 carried by the support structure of the arms 16 and 18, and the light 126 supported by the carriage arms 112 and 114 are energized during use of the device 10. The lamps 82 provide illuminated spots on the Lucite plate 15 corresponding to the positions of the targets from which signals are being reflected for the distance measurement information. The lamp 126 provides an illuminated spot on the Lucite plate 15 corresponding to the position of the ship. Thus, when a map of the area is placed on the Lucite plate 15 and properly oriented with respect to the map of the area on the support surface 14 upon which the arms 16 and 18 are positioned, three spots on the map covering the Lucite plate 15 will be observable by an operator standing and watching the device. The operator can then continuously watch the course of the ship by watching the illuminated spot produced by the lamp 126 and will be constantly aware of the position of the ship with respect to the two targets indicated by illuminated spots produced by the lamps 82. Therefore, the operator of the system can use this visual information in steering the ship and performing the other numerous operations involved with navigation.

The roller 132 (FIG. 4) is in constant contact with either the support surface 14 or a map of the area placed on the support surface 14 to retain the carriage arms 112 and 114 at a fixed level and minimize the friction involved in moving the arms 16 and 18. The pen or scribe 128 may mark a continuous line on the map positioned on the support surface 14. However, we preferably provide a dashed line by means of the scribe 128 to make a recording of the course traveled by the ship wherein the lengths of the dashes can easily be correlated to the speed of the ship. This operation may be performed by means of a circuit as illustrated in FIG. 8. The pen 128 is attached to the core 160 of a solenoid. The coil 162 of this solenoid is successively energized and de-energized by any suitable direct current source 164 and switch 166 connected in series with the coil. The switch 166 is operated by a suitable timing motor 168. It will then be apparent that the pen 128 is raised and lowered upon the opening and closing of the switch 166, and the rate of opening and closing of the switch 166 is controlled by the operation of the timing motor 168. The pen 128 preferably makes dashed lines of equal lengths on the respective map.

In summarizing the operation of the device 10, it will be observed that the axes 20 and 22 are positioned on a map overlying the support surface 14 at points corresponding to the positions of reflecting targets utilized in the distance measuring system utilizing the present plotter. It will also be noted that the lamps 82 provide illuminated spots on the Lucite plate 15 corresponding to the same positions. Therefore, a map could be used only on top of the Lucite plate 15 and no map used on the support surface 14, although we prefer to provide substantially identical maps on both the support surface 14 and the Lucite plate 15. As voltages representing distance measurements are fed to the terminals 169 of the servo systems of the arms 16 and 18, the arms are extended and retracted as necessary to position the reference station 24 over the map on the support surface 14 at a point corresponding to the position of the ship. This information is also displayed on the Lucite plate 15 by means of the lamp 126 in order that the operator of the system may easily observe the relative positions of the ship and the two targets.

The arms 16 and 18 are easily extended and retracted by use of the cables 154, 156 and 158. The cooperating bearings 102 between the various channels of each arm provide a minimum of friction, and the various pulleys are arranged in such a manner that the lighter channels are normally moved before the heavier channels to minimize the mass required to be moved by the various cables. It may also be noted that since the lighter channels are normally extended first, each arm 16 and 18 always has the minimum of mass extended from the respective support structure to minimize the forces imposed on these arms during rolling or pitching of the ship.

Although the differential generator 50, pulleys 42 and 48 and chain 44 are shown in the structural drawing of FIG. 3, these components are not required in the device 10 when the device is merely provided with a lamp 126 indicating the position of the ship on the Lucite plate 15. The differential generator 50 is utilized with the modified embodiment illustrated in FIGS. 9 and 10 wherein the lamp 126 is replaced by a cathode ray tube to provide a visual display on the Lucite plate 15, as will be described below.

Figure 9:
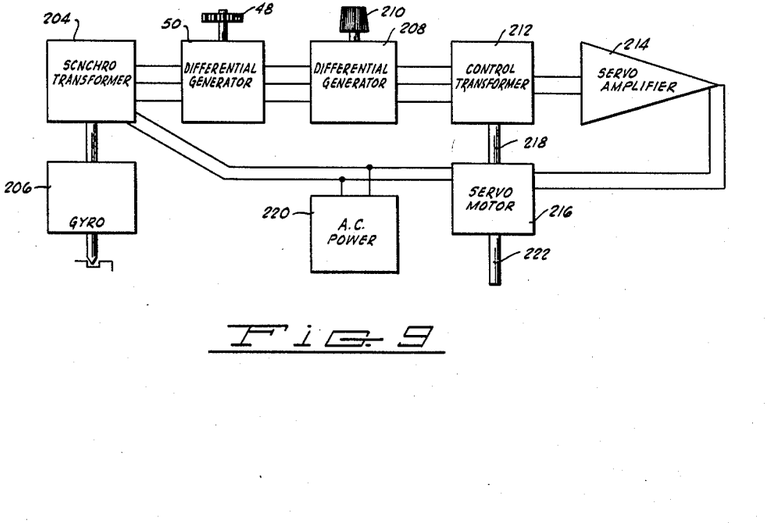
FIGURE 9 is a block circuit diagram of an embodiment of the present invention.
Figure 10:
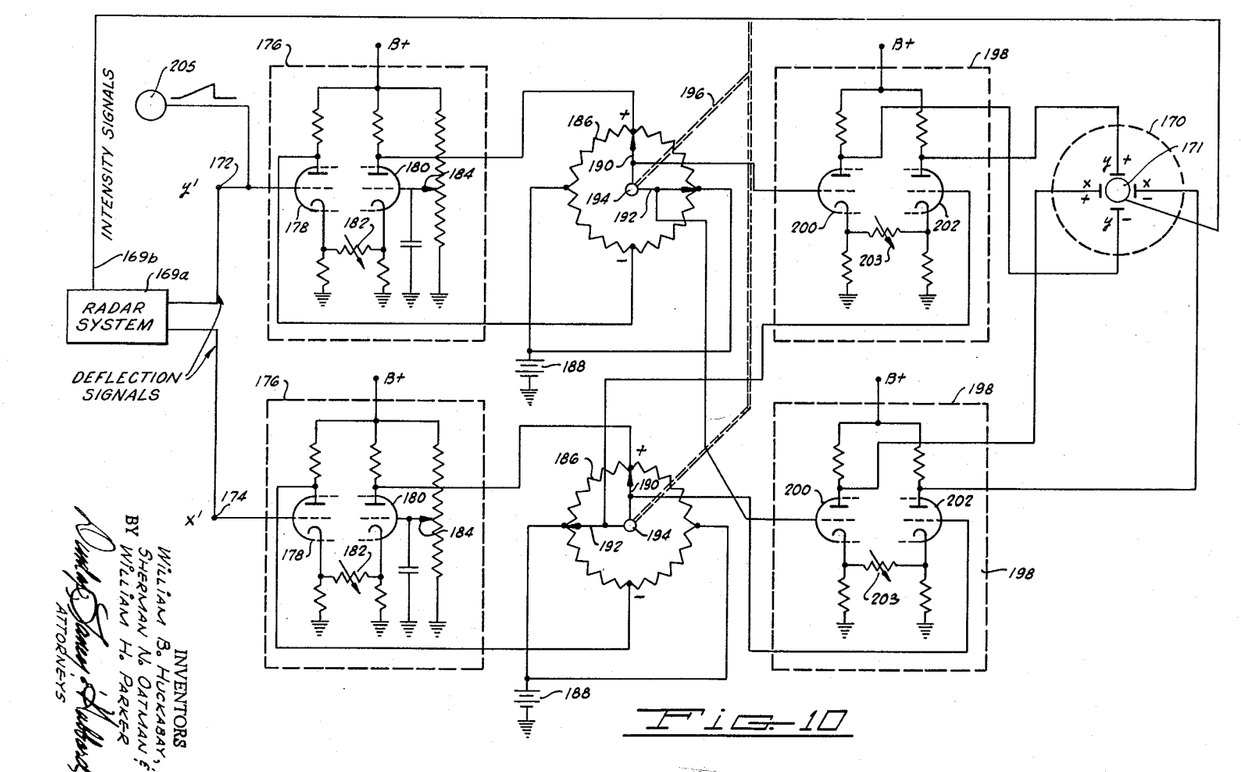
FIGURE 10 is a circuit diagram of an embodiment of the present invention and is to be considered in combination with FIG. 9.

Embodiment of FIGS. 9 and 10

As indicated above, this invention also contemplates a replacement of the lamp 126 of the station reference means 24 with a projection-type cathode ray tube 170 schematically illustrated in FIG. 10. The cathode ray tube 170 may easily be provided with a focusing lens system (not shown) to provide a visual display of position or object information on the Lucite plate 15, and, hence, on the map covering the Lucite plate. For example, when the present device is being used as a navigation aid, the locations of objects in the vicinity of the ship may be detected by a radar system 169a oriented relative to the heading of the ship, and this information is fed to the Y and X deflection plates of the cathode ray tube 170 by a novel system to be described, as well as to the intensity grid 171 of the cathode ray tube 170 by a conductor 169b. The image produced by the tube 170 would then be focused onto the Lucite plate 15 and the operator of the system can visually observe the positions of the various objects at the same time he is visualizing the progress being made by the ship. However, the image produced by the cathode ray tube 170 is displayed on the map covering the Lucite plate 15, and the map would only by coincidence be orientated to true north. Therefore, the image produced by the cathode ray tube 170 must be orientated to the true north indicated on the map. Also, it will be recalled that the lamp 126, and hence the cathode ray tube 170, is rigidly secured on the carriage arm 112 extending from the telescoping arm 16. Therefore, as the arm 16 changes its angular position in response to movement of the ship, the cathode ray tube 170 will be simultaneously turned a corresponding amount. This turning or shifting of the cathode ray tube 170 with respect to the map on which the image is displayed must also be taken into account in order to focus the images of various objects in their correct positions on the map. The apparatus illustrated in FIGS. 9 and 10 is provided for this purpose.

The $Y^1$ and $X^1$ signals provided by a radar system 169a oriented relative to the heading of the ship are fed to the terminals 172 and 174 illustrated at the left-hand end of FIG. 10. Positive $Y^1$ signals indicate ranges forward; negative $Y^1$, astern; positive $X^1$, starboard, and negative $X^1$, port. Each of these signals is fed to a combination phase inverter and amplifier 176 and the description of only one of these devices will be sufficient. Each phase inverter and amplifier 176 comprises a pair of triodes 178 and 180 having suitably applied plate voltage and having their cathodes interconnected by a variable resistor 182 for gain control. Balance of the triodes 178 and 180 is maintained by an adjustable resistor 184 connected between the plate voltage source and ground.

The $Y^1$ or $X^1$ signal being considered is applied to the grid of the tube 178, and the grid of the tube 180 is connected to the movable contact of the adjustable resistor 184. Thus, an amplified counterpart of the signal applied to the grid of the tube 178 appears at the plate of the tube 180, and an inverted and amplified counterpart thereof is provided at the plate of the tube 178. The positive and negative signals from each phase inverter and amplifier 176 are directed to the opposite sides of a sine-cosine potentiometer 186, it being understood that a potentiometer 186 is provided for each of the phase inverters and amplifiers 176. The remaining ninety degree or opposed points on each potentiometer 186 are supplied a biasing voltage by a suitable direct current source 188 to provide the sine-cosine response on the moving contacts 190 and 192 of the respective potentiometer. The moving contacts 190 and 192 of each potentiometer 186 are mounted in fixed ninety degree relation on a shaft 194 and both of the shafts 194 of the potentiometers are interconnected by a suitable mechanical linkage 196 for turning the shafts 194 in equal amounts when it is necessary to change the orientation of the image produced by the cathode ray tube 170, as will be described more in detail below.

The signal from one of the contacts of each potentiometer 186 is compared with the signal produced at one of the contacts of the other potentiometer 186 by a combination phase inverter and comparator 198. The remaining two contacts of the potentiometers 186 are compared in a similar manner by another combination phase inverter and comparator 198, such that the construction of one of these comparators will be sufficient.

Each device 198 comprises a pair of triodes 200 and 202 having their cathodes interconnected by a variable resistor 203 for gain control. The plates of both of these triodes are provided with equal plate voltage. The signals to be compared are imposed on the grids of the two triodes and the plates of the two triodes are connected to opposing deflection plates of the cathode ray tube 170.

With the sine-cosine potentiometers 186 in their positions illustrated in FIG. 10, the $Y^1$ and $X^1$ signals imposed on the terminals 172 and 174 are applied to the proper deflection plates of the cathode ray tube 170 to orient the image produced by the cathode ray tube 170 in the same angular position as the image produced from the cathode ray tube from which the respective $Y^1$ and $X^1$ signals are derived. To illustrate, one can follow the $Y^1$ signal imposed on terminal 172 and note that an amplified counterpart of this signal is produced at the plate of the triode 180 and applied to the positive terminal of the respective potentiometer 186. This same signal is picked up by the contact 190 and fed to the grid of the triode 200 of the combination phase inverter and comparator 198. An inverted counterpart of this signal is therefore produced in the plate circuit of the tube 200 and is fed to the negative Y deflection plate of the cathode ray tube 170. In tracing the $X^1$ signal applied to the terminal 174, it is found that an amplified and negative counterpart of this signal is applied to the negative X deflection plate of the cathode ray tube 170.

If the cathode ray tube 170 is then physically turned ninety degrees, as by movement of the telescoping arm 16 through an arc of ninety degrees, the shaft 194 of each potentiometer 186 would be moved a corresponding amount, in a manner to be described below. In tracing the $Y^1$ signal applied to the terminal 172 in these new positions of the potentiometers 186 and the cathode ray tube 170, it is found that a negative counterpart of this signal is fed to the negative terminal of the respective potentiometer 186. This negative signal is then picked up directly by the respective contact 192 and fed to the grid of the triode 200 of the lowermost combination phase inverter and comparator 198. Therefore, an amplified positive counterpart of this signal is applied to the normal positive X deflection plate of the cathode ray tube 170— which results in a shifting of the image produced by the cathode ray tube 170 ninety degrees. Thus, the image displayed by the cathode ray tube 170 on the Lucite plate 15 and the map on the plate 15 will remain orientated in the same direction as before. The sine-cosine potentiometers 186 provide corresponding reorientation of the image produced by the cathode ray tube 170 for degrees of rotation of the shafts 194 greater or less than ninety degrees, as the case may be, and as will be readily understood by those skilled in the art.

As will also be observed in FIG. 10, a saw-tooth generator 205 is connected to the conductor leading from the $Y^1$ terminal 172 to the grid of tube 178 to impose a periodic, positive saw-tooth signal on the $Y^1$ signals as a ship's heading signal. The saw-tooth signal is passed through the circuit shown in FIG. 10 and appears on the tube 170 to continually indicate the ship's heading thereon.

The positions of the shafts 194 of the potentiometers 186 are controlled by a servo system illustrated in FIG. 9. This system comprises a synchro-transmitter 204 operated by a gyro 206 which will normally be a part of the navigation equipment on the ship utilizing this system. The synchro-transmitter, by being driven by the gyro 206, produces a signal having a phase representative of the heading of the ship with respect to true north, with changes in phase being produced by changes in the heading of the ship. The signal produced by the transmitter 204 may be called a "heading signal" and is fed to the differential generator 50 having its control shaft connected to the sprocket 48. As previously described in connection with FIG. 3, the sprocket 48 is turned in response to changes in the angular position of the telescoping arm 16, and changes in the angular position of the arm 16 changes the orientation of the cathode ray tube 170. Therefore, the sprocket 48 adjusts the differential generator 50 in response to physical changes in the angular position of the cathode ray tube 170 and varies the phase of the signal coming from the synchro-transmitter 204 accordingly.

The resulting signal from the differential generator 50 is in turn fed to another differential generator 208 having a manual control knob 210. The differential generator 208 is provided to vary the phase of the "heading" signal in accordance with the difference between true north and the true north indicated on the map, in order to orientate the image on the map. The control knob 210 will be set each time a new map is placed on the Lucite plate 15 in order to orient the image produced by the cathode ray tube 170 to true north in accordance with the map, but the knob 210 is then left in this position until a new map is utilized. The resulting "heading" signal is in turn passed to a control transformer 212 which drives a servo amplifier 214 and a servomotor 216. Also, the servomotor is connected back to the control transformer 212 by shaft 218 to provide a feedback from the servomotor 216 to the control transformer and prevent operation of the servomotor except upon a phase change of the signal being fed to the control transformer 212. When the phase of the "heading" signal is changed, a signal is fed through the servo amplifier 214 to operate the servomotor 216 until the control transformer is adjusted by means of the shaft 218 to null out the "heading" signal. Both the synchro-transmitter 204 and the servomotor 216 are provided with suitable power from an alternating current power supply 220.

The output shaft 222 of the servomotor 216 is suitably connected to the mechanical linkage 196 previously described in connection with FIG. 10 as being connected to the shafts 194 of the sine-cosine potentiometers 186. Thus, the potentiometers 186 are adjusted in response to three events: changes in the desired orientation of the cathode ray tube 170 by reason of changing the map on the Lucite plate 15; changes in the angular position of the cathode ray tube 170 by virtue of pivoting movement of the telescoping arm 16 of the plotter, and changes in the heading of the ship. Thus, the image produced by the cathode ray tube 170 will remain orientated on the map placed on the Lucite plate 15 and the operator of the system may easily correlate the positions of objects in this image display with the surrounding area.

From the foregoing it will be apparent that the present invention provides a position indicating and course plotting device which is both compact and efficient in operation. The device is substantially unaffected by rolling or pitching movements of the ship on which the device is used, which makes the device useful on substantially any type of transporting device. The apparatus of this invention provides a visual display of the position and course of a ship on which it is used, and the display provided by the device may easily include representations of objects in the vicinity of the ship. When such images of objects in the vicinity are provided in the display, the image is retained orientated, regardless of changes in the heading of the ship or of changes in the physical orientation of the cathode ray tube producing the images. The device is simple in construction, is easy to operate and will have a long service life.

Changes may be made in the combination and arrangement of parts or elements as heretofore set forth in this specification and shown in the drawings, it being understood that changes may be made in the embodiments disclosed without departing from the spirit and scope of the invention as defined in the following claims.

We claim:

1. A device for continuously indicating the position of a station moving relative to first and second targets of known locations comprising:
   first and second telescopic arms each pivotally supported at one end thereof for pivotal movement about first and second pivotal axis representing the positions of the first and second targets respectively, each of said arms being comprised of a plurality of nesting channel members, each of the channel members having an elongated web portion and a flange extending along each side of the web, the flanges of adjacent nesting channel members having pairs of facing surfaces, each pair of facing surfaces having a pair of aligned groove bearing races, one bearing race being in each of the surfaces, and bearing means in each pair of aligned groove bearing races;
   station reference means pivotally interconnecting the ends of the first and second arms remote from said pivotal axis;
   servo means mounted on said first telescopic arm for moving the station reference means to a point spaced from the first axis a distance proportional to the momentary distance between the station and the first target; and
   servo means mounted on said second telescopic arm for moving the station reference means to a point spaced from the second axis a distance proportional to the momentary distance between the station and second target, whereby the position of the station relative to the first and second targets will continuously be indicated by the position of the station reference means relative to the first and second pivotal axis, respectively.

2. A device for continuously indicating the position of a station moving relative to first and second targets of known locations as defined in claim 1 wherein the groove bearing races have arcuately shaped cross sections and each bearing means comprises a plurality of balls, and spacer means disposed between the facing surfaces for retaining the balls in spaced relation one to the other.

3. A device for continuously indicating the position of a station moving relative to first and second targets of known locations comprising:
   first and second support means each including footing means on the bottom thereof to enable rigid adherence in a given position;
   a first telescoping arm having first and second ends, the first arm being pivotally connected at the first end thereof to the first support means;
   a second telescoping arm having first and second ends, the second arm being pivotally connected at the first end thereof to the second support means;
   station reference means pivotally interconnecting the second ends of the first and second telescoping arms;
   first servo means affixed on said first telescoping arm and receiving electrical signals indicative of the distance between the station and the first target for telescopically moving the first arm to a length such that the distance between the station reference means and the first support means is proportional to the momentary distance between the station and first target; and
   second servo means affixed on said second telescoping arm and receiving electrical signals indicative of the distance between the station and the second target for telescopically moving the second arm to a length such that the distance between the station reference means and the second support means is proportional to the momentary distance between the station and the second target, whereby the position of the station reference means relative to the first and second support means will represent the position of the station relative to the first and second targets.

4. In a position indicating system for a mobile station, the combination of:
   a map;
   a cathode ray tube having an intensity grid and two sets of deflection plates and arranged to project images on the map;
   means for moving the cathode ray tube relative to the map in accordance with changes in position of the station;
   an object detection system on the station for scanning the area around the station and detecting objects in the vicinity of the station, said detection system producing cathode ray tube deflection signals oriented in a given direction and cathode ray tube intensity signals representative of objects in the vicinity of the station;
   means connecting the object detection system to the intensity grid of the cathode ray tube to reproduce on the map images of objects relative to the station; and
   means for feeding the deflection signals from said object detection system to the deflection plates on the cathode ray tube in accordance with changes in the position of the cathode ray tube to maintain the images of said objects oriented with respect to the map.

5. A position indicating system as defined in claim 4 wherein said means for feeding the deflection signals to said deflection plates includes a pair of sine-cosine potentiometers, each of said potentiometers having a pair of contacts supported 90° apart, and means for adjusting said contacts equal amounts in accordance with changes in position of the cathode ray tube.

6. A position indicating system as defined in claim 5 wherein said means for adjusting said contacts includes a gyro, a synchro transformer driven by the gyro to produce a signal indicative of true north, a servomotor connected to said contacts and a servo system interconnecting the synchro transformer and servomotor, said servo system including a differential generator having a control shaft, and means for turning said control shaft in correspondence with the turning movements of the cathode ray tube to change the phase of said signal and drive the servomotor in accordance with the turning movements of the cathode ray tube.

7. A position indicating system as defined in claim 6 wherein said means for moving the cathode ray tube in accordance with changes in position of the station comprises:

first and second elongated arms supported for pivotal movement in planes parallel with the map;
a carriage arm secured to each of the first and second elongated arms;
bearing means pivotally interconnecting the carriage arms and supporting the cathode ray tube, said cathode ray tube being rigidly supported relative to the first elongated arm for turning movement with said first elongated arm; and
means for moving each of the carriage arms along the longitudinal axis of the respective elongated arm in response to changes in position of the station with respect to a fixed point, whereby the elongated arms pivot around their pivot points upon movement of the station and the cathode ray tube is turned in accordance with movement of the first elongated arm, and wherein said means for turning said control shaft comprises:
a bracket securing the differential generator on the first elongated arm in spaced relation from the pivot point of the first elongated arm;
a fixed support pivotally supporting the first elongated arm;
a sprocket rigidly secured to the fixed support;
a sprocket secured on said control shaft, and
a chain encircling both of said sprockets for turning said control shaft in correspondence with pivoting movement of the first elongated arm and in correspondence with turning of the cathode ray tube.

8. A position indicating system as defined in claim 4 wherein said means for moving the cathode ray tube in accordance with changes in position of the station comprises:

first and second elongated arms supported for pivotal movement in planes parallel with the map;
a carriage arm secured to each of the first and second elongated arms;
bearing means pivotally interconnecting the carriage arms and supporting the cathode ray tube; and
means for moving each of the carriage arms along the longitudinal axis of the respective elongated arm in response to changes in position of the station with respect to a fixed point, whereby the elongated arms pivot around the pivot points upon movement of the station and the cathode ray tube is moved with respect to the map.

References Cited by the Examiner

UNITED STATES PATENTS

| | | | |
|---|---|---|---|
| 2,191,730 | 2/40 | Sjostrand | 343—112 |
| 2,422,025 | 6/47 | Luck | 343—10 |
| 2,489,251 | 11/49 | Anast | 343—112 |
| 2,566,247 | 8/51 | Pierce et al. | 33—1 |
| 2,587,467 | 2/52 | Hawkins et al. | 343—112 |
| 2,705,793 | 4/55 | Litchford | 343—16 |
| 2,718,061 | 9/55 | Omberg et al. | 343—112 X |
| 2,732,992 | 1/56 | Arps | 182—208 |
| 2,771,593 | 11/56 | Straehl | 343—112.1 |
| 2,792,989 | 5/57 | Luck | 343—112.1 |
| 2,794,594 | 6/57 | Ergen et al. | 343—112.1 |
| 2,919,036 | 12/59 | Raymond | 212—55 |
| 2,922,159 | 1/60 | Frank | 343—112 |
| 2,933,816 | 4/60 | Gunther | 33—164 |
| 3,050,707 | 8/62 | Baker et al. | 343—112 |
| 3,071,765 | 1/63 | Schutz | 343—5 |

CHESTER L. JUSTUS, *Primary Examiner.*